US012730095B2

(12) United States Patent
Stallone et al.

(10) Patent No.: US 12,730,095 B2
(45) Date of Patent: Sep. 8, 2026

(54) THERMAL MODULATOR

(71) Applicant: LECO Corporation, St. Joseph, MI (US)

(72) Inventors: Gaetano Stallone, Bari (IT); Mark Firmer Merrick, Bridgman, MI (US)

(73) Assignee: LECO Corporation, St. Joseph, MI (US)

( * ) Notice: Subject to any disclaimer, the term of this patent is extended or adjusted under 35 U.S.C. 154(b) by 349 days.

(21) Appl. No.: 18/503,699

(22) Filed: Nov. 7, 2023

(65) Prior Publication Data

US 2024/0329013 A1 Oct. 3, 2024

Related U.S. Application Data

(62) Division of application No. 17/385,742, filed on Jul. 26, 2021, now Pat. No. 11,846,614, which is a (Continued)

(51) Int. Cl.
*G01N 30/30* (2006.01)
*G01N 30/46* (2006.01)

(52) U.S. Cl.
CPC ..... *G01N 30/30* (2013.01); *G01N 2030/3023* (2013.01); *G01N 2030/303* (2013.01); (Continued)

(58) Field of Classification Search
CPC .... G01N 30/465; G01N 30/463; G01N 30/30; G01N 2030/3023; G01N 2030/303; G01N 2030/3053
See application file for complete search history.

(56) References Cited

U.S. PATENT DOCUMENTS 3,997,298 A * 12/1976 McLafferty ............ G01N 30/34 210/198.2
5,564,278 A * 10/1996 Gallivan .................. F25B 9/02 62/51.1

(Continued)

FOREIGN PATENT DOCUMENTS

JP H08327615 A * 12/1996
WO 2005-093405 A2 10/2005
WO 2011049894 A2 4/2011

OTHER PUBLICATIONS

International Search Report dated Aug. 18, 2018, relating to International Application No. PCT/US2017/025744.

(Continued)

*Primary Examiner* — Natalie Huls
(74) *Attorney, Agent, or Firm* — Honigman LLP; Thomas J. Appledorn; Grant Griffith

(57) ABSTRACT

A method for modulating analytes in a gaseous stream passing through a capillary, wherein the analytes are retained in a trapping zone of the capillary, or allowed to pass therethrough, based on certain conditions. The method includes, during a first time period, heating the trapping zone of the capillary to a first temperature to desorb analytes therewithin and allow the analytes to pass therethrough, and during a second time period, cooling the capillary to a second temperature that is sufficient to trap and focus the analytes within the trapping zone. During the first time period, the method also includes retaining heat at the capillary during to minimize the load on a cooling device thermally connected thereto, and during the second time period, selectively allowing thermal transfer toward the cooling device.

14 Claims, 9 Drawing Sheets

Related U.S. Application Data division of application No. 16/090,565, filed as application No. PCT/US2017/025744 on Apr. 3, 2017, now Pat. No. 11,073,502.

(60) Provisional application No. 62/317,171, filed on Apr. 1, 2016.

(52) U.S. Cl.
CPC ... *G01N 2030/3053* (2013.01); *G01N 30/463* (2013.01); *G01N 30/465* (2013.01)

(56) References Cited

U.S. PATENT DOCUMENTS

| | | | | |
|---|---|---|---|---|
| 5,724,832 | A * | 3/1998 | Little | F25J 1/0279<br>62/48.2 |
| 6,021,845 | A * | 2/2000 | Hill | G01N 30/12<br>165/185 |
| 6,076,357 | A * | 6/2000 | Holdren | G01N 30/12<br>62/3.2 |
| 6,547,852 | B2 * | 4/2003 | Ledford, Jr. | G01N 30/30<br>95/87 |
| 2004/0169771 | A1 * | 9/2004 | Washington | H04N 23/52<br>348/E5.025 |
| 2005/0247104 | A1 * | 11/2005 | Hasselbrink | G01N 30/465<br>73/23.42 |
| 2005/0268693 | A1 | 12/2005 | Hasselbrink et al. | |
| 2011/0088452 | A1 * | 4/2011 | Kim | G01N 30/465<br>73/23.42 |
| 2011/0232366 | A1 * | 9/2011 | Guan | G01N 30/465<br>73/23.42 |
| 2013/0055791 | A1 * | 3/2013 | Sotomaru | G01N 30/12<br>73/863.11 |
| 2013/0186175 | A1 * | 7/2013 | Brockwell | G01N 30/465<br>73/23.42 |
| 2014/0298990 | A1 | 10/2014 | Fan et al. | |
| 2015/0204827 | A1 | 7/2015 | Duraffourg et al. | |
| 2015/0346171 | A1 | 12/2015 | Hirooka | |
| 2018/0259493 | A1 * | 9/2018 | Guan | G01N 30/465 |
| 2020/0041466 | A1 * | 2/2020 | Merrick | G01N 30/46 |

OTHER PUBLICATIONS

Gustavo Serrano et al; "Comprehensive Two-Dimensional Gas Chromatographic Separations with a Microfabricated Thermal Modulator", Analytical Chemistry, vol. 84, No. 16, Jul. 31, 2012 (Jul. 31, 2012), pp. 6973-6980, XP55245659, US ISSN: 0003-2700, DOI: 10.1021/ac300924b, p. 6974-p. 6975.

Extended European Search Report for EP Application No. 17776909.8 dated Oct. 24, 2019.

Non-Final Office Action dated Sep. 21, 2020, by the U.S. Patent and Trademark Office relating to U.S. Appl. No. 16/090,565.

Final Office Action dated Jan. 21, 2021, by the U.S. Patent and Trademark Office relating to U.S. Appl. No. 16/090,565.

European Patent Office, Office Action for Application No. 17776909.8 dated Sep. 27, 2022.

European Patent Office, Office Action for Application 17776909.8 dated Jan. 2, 2024.

International Search Report and Written Opinion dated May 21, 2020, relating to International Application No. PCT/US2020/013989.

Vendeuvre, C. et al., "Comprehensive Two-Dimensional Gas Chromatography for Detailed Characterisation of Petroleum Products", Oil & Gas Science and Technology—Rev. IFP, 2007, vol. 62, No. 1, pp. 43-55.

Lebanov, L. et al., "Multidimensional Gas Chromatography in Essential Oil Analysis, Part 1: Technical Developments", Chromatographia, Oct. 31, 2018 (Online Published), vol. 82, pp. 377-398 [abstract].

Marriott, P.J. et al., "The modulation ratio in comprehensive two-dimensional gas chromatography: a review of fundamental and practical considerations", Scientia Chromatographica, 2016, vol. 8, No. 1, pp. 7-23.

* cited by examiner 33
56
57
16
40
36
60a
38
30
18
44
46
48
50
54
52
42
W
62a
58
28
26
24

THERMAL MODULATOR

CROSS-REFERENCE TO RELATED APPLICATIONS

This U.S. patent application is a divisional of, and claims priority under 35 U.S.C. § 121 from, U.S. patent application Ser. No. 17/385,742, filed on Jul. 26, 2021, which is a divisional of U.S. patent application Ser. No. 16/090,565, filed on Oct. 1, 2018, which is a national stage of International Application No. PCT/US2017/025744, filed on Apr. 3, 2017, which claims priority under 35 U.S.C. § 119 (e) to U.S. Provisional Application 62/317,171 filed on Apr. 1, 2016. The disclosures of these prior applications are considered part of the disclosure of this application and are hereby incorporated by reference in their entireties.

TECHNICAL FIELD

This disclosure relates to a thermal modulator, and to a method for modulating analytes within a capillary in a chromatographic system.

BACKGROUND

Fast heating combined with low temperatures for trapping have been acknowledged as desirable for narrow reinjection in chromatography systems. Fast heating has been achieved by, for example, hot gas jets, movement of the trapped zone into the hot zone of a hot air bath, resistive heating of metal capillary columns, metal coated fused silica columns, or small diameter metal tubing through which a capillary column is passed, among other things. Without cryogenic temperatures it is difficult to easily achieve narrow reinjections. With little cooling power it is difficult to modulate fast.

Systems using liquid nitrogen for cooling are sought for high performance in that they can reach cryogenic temperatures, but operating expenses associated with such systems are high and can be commercially impractical in many contexts. Consumable-free modulators are alternatively utilized (e.g., thermoelectric coolers) at a lower cost, but often cannot yield cryogenic temperatures and may not have much cooling power.

SUMMARY

One aspect of the disclosure provides a device for a chromatographic system, such as a thermal modulator. An example of such a thermal modulator relates to a device that extends between a cooling device and a capillary and may include: a cold finger defining a chamber having an inner wall, a thermal buffer disposed about the inner wall of the cold finger, and a heater situated between the capillary and the thermal buffer.

Another aspect of the disclosure provides a thermal modulator for a chromatographic system that includes a chamber defining an internal portion and a capillary disposed within the chamber. The capillary may have an input, an output, and an elongate body extending between the input and the output. The device may further include a cold finger. The cold finger may have a first portion in thermal contact with a portion of the elongate body to define a capillary trapping zone. The first portion may extend to a second portion that is situated external to the chamber. The device may also include a heater, a thermal buffer, and a cooling device. The heater may be in thermal contact with the capillary trapping zone and configured to transfer heat to the trapping zone. The thermal buffer may be configured to buffer the rate of heat transfer from the heater into the cold finger and thereby retain the heat within the capillary trapping zone. The cooling device may be arranged external to the chamber, thermally connected to the second portion of the cold finger to define a primary conduction zone, and configured to generate a cooling temperature zone at the primary conduction zone. The controller may be configured to selectively alternate the trapping zone between a cooling temperature and an injection temperature by alternating the heater between an off state and an on state at a user defined frequency and using the cooling device together with its engagement with the cold finger.

Another aspect of the disclosure provides a method for modulating analytes in a gaseous stream passing through a device. The analytes may be retained in the device, or allowed to pass through the device, based on certain device conditions. The method may include providing a capillary that extends through a heating member. The capillary and heating member may be surrounded by a thermal buffer. The method may also include providing a cold finger terminating at a cold tip at a position that is external to the device. The method may also include, during a first time period, heating the heater to a first temperature to desorb the analytes within the capillary to allow the analytes to pass through the capillary. The method may also include, during a second time period, turning off the heater and cooling the capillary to a second temperature that is sufficient to trap and focus the analytes in the capillary. The system is configured to (i) reduce thermal transfer between the cooling device and the capillary during the first time period to allow the capillary to heat quickly and to thereby minimize a heat load experienced by the cooling device, and (ii) increase the thermal transfer between the cooling device and the capillary via the cold finger during the second time period.

In some examples, the chromatograph is a gas chromatograph. In other examples, the chromatograph is a two-dimensional gas chromatograph, such as a comprehensive two-dimensional gas chromatograph.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

This disclosure describes an exemplary system having a device for modulating analytes in a chromatograph. This disclosure will describe a system in which such a device is employed in a comprehensive two-dimensional gas chromatography system ("GC×GC"), and where the device is utilized as a thermal modulator for the system. The described GC×GC system is included to provide an exemplary environment in which the device may be employed, but the device is not intended to be limited to such a system. For example, and among others, the device may be utilized (i) between columns in a chromatographic system or (ii) to introduce a sample before a first column, as well. It will also be understood that the device may be utilized in systems other than gas chromatographs.

In some implementations, a two-dimensional gas chromatography system includes a device configured as a thermal modulator to provide sufficiently narrow reinjection bands, at high frequencies, for quick modulation and optimum comprehensive two-dimensional gas chromatography. As described herein, efficient thermal control can yield sufficiently narrow bands, with fast modulation. In some implementations, the device is configured to accomplish a steep thermal gradient at a trapping portion of a capillary that extends through the device while minimizing the thermal load at a cooling device. For example, a trapping portion of the capillary is heated and cooled such that analytes in the trapping zone of the capillary are desorbed and/or passed through the capillary (while heated) and trapped and/or focused (while cooled).

In implementations, and as described herein, the device provides an efficient way to obtain the desired, and alternating, temperatures in a capillary.

Figure 1A:
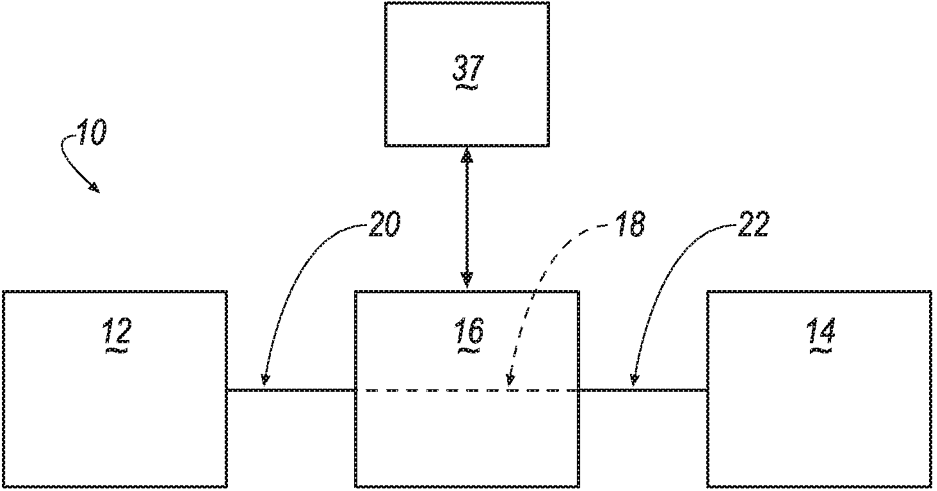
FIG. 1A is a schematic view of an example of a chromatographic system, utilizing a device in accordance with the principles of the present disclosure.

Now, with reference to the figures, FIG. 1A illustrates a portion of a chromatographic system 10 that employs a gas chromatograph 12, a detector 14, and a device 16 between gas chromatograph 12 and detector 14. As described above, device 16 may be a thermal modulator; and, in the exemplary system 10 hereafter described device 16 will be used as a thermal modulator. So for the remainder of this disclosure, device 16 may be referenced as thermal modulator 16 or device, yet the invention should not be so limited to a thermal modulator in such a system 10.

In some implementations, a capillary 18 is provided between gas chromatograph 12 and detector 14. The capillary 18 may extend through thermal modulator 16 as shown in FIGS. 1A, 1B, and 1C.

In some implementations, a sample (not shown) is transferred through capillary 18 from the gas chromatograph 12 to thermal modulator 16 via an input portion 20 of capillary 18. After passing through modulator 16, the sample may be further transferred from thermal modulator 16 to detector 14 (or other external gas chromatographic detectors, columns, or the like (not shown)) through an output portion 22 of capillary 18. While a single capillary is described, it is to be understood that more than one capillary 18, transfer line, and other means for passing samples into, and out of, the modulator 16 may be utilized. For example, and without limitation, a second column may be introduced.

Figure 2A:
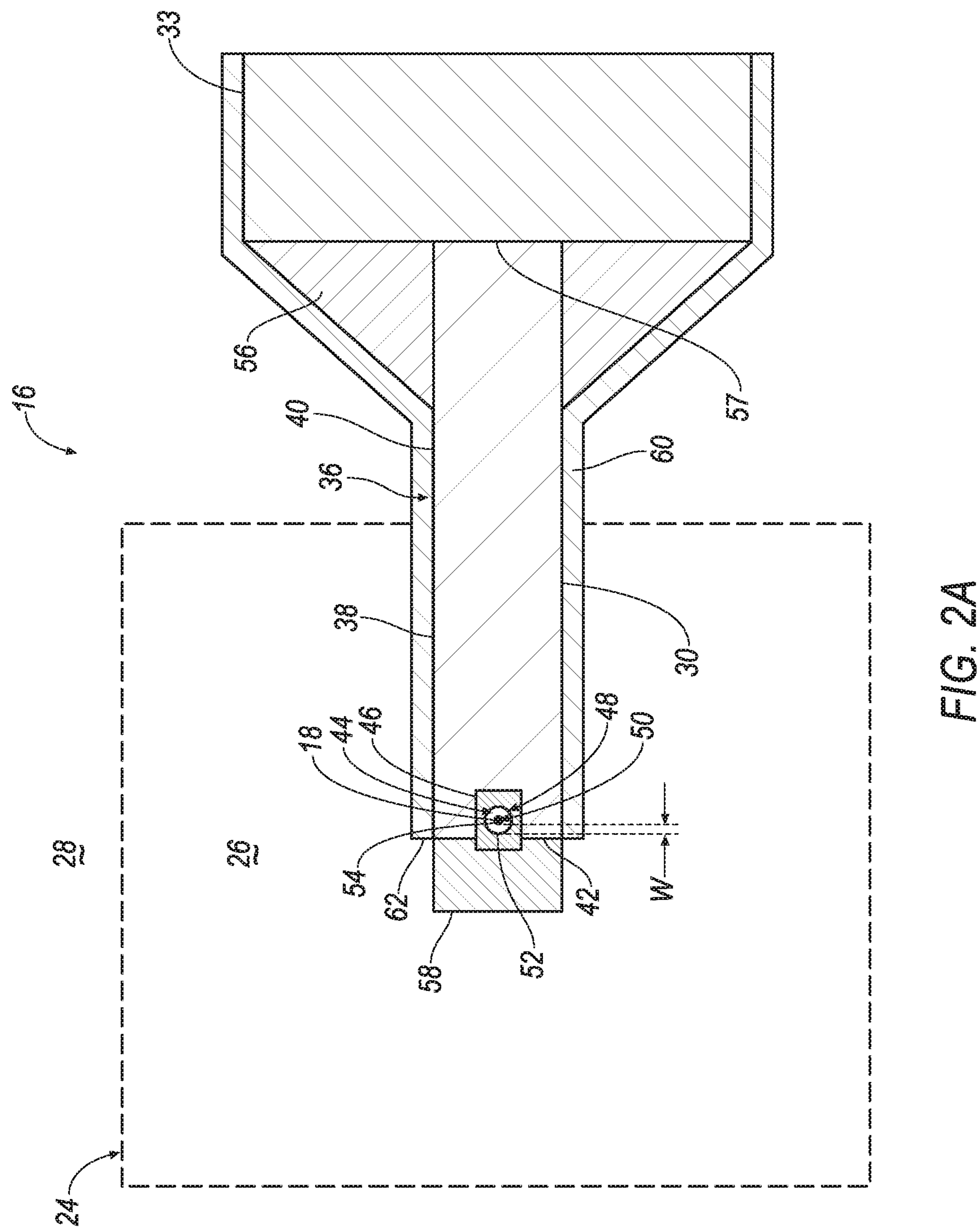
FIG. 2A is a cross-sectional view of an example of a device for the system of FIG. 1.

With reference to FIG. 2A, in some implementations, device 16 includes a chamber 24 defining an internal portion 26. Capillary 18 is disposed within internal portion 26 of chamber 24. As illustrated in FIG. 1A, capillary 18 includes input 20, output 22, and an elongate body that extends between input 20 and output 22. In an implementation, chamber 24 may be an oven. Other implementations include an ambient controlled temperature chamber, or simply an enclosed space.

Figure 1B:
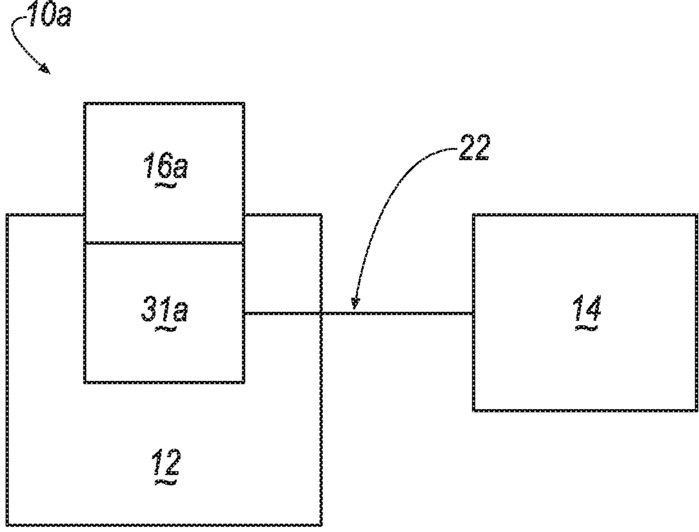
FIG. 1B is a schematic view of another example of a chromatographic system, utilizing a device in accordance with the principles of the present disclosure.
Figure 1C:
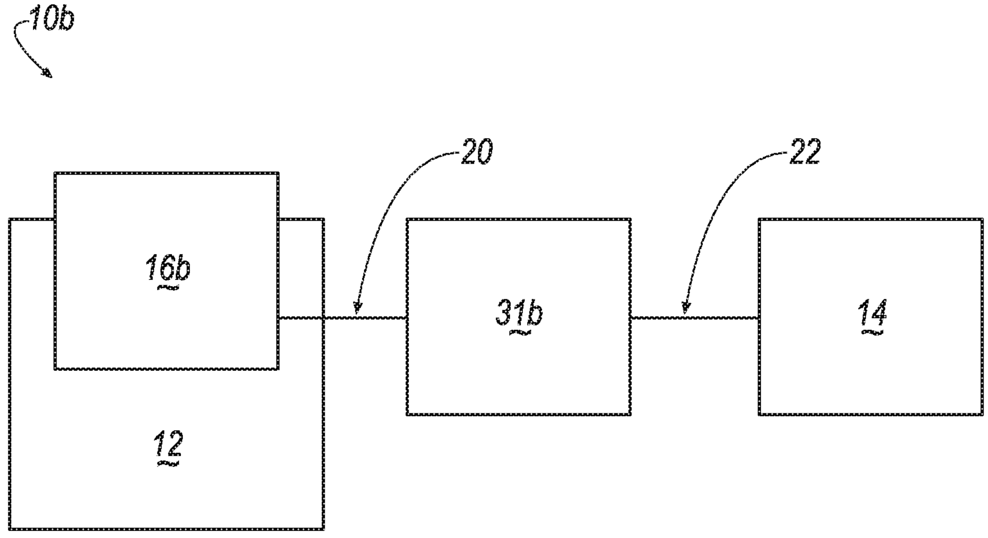
FIG. 1C is a schematic view of another example of a chromatographic system, utilizing a device in accordance with the principles of the present disclosure.

With reference to FIGS. 1B and 1C, other implementations of a chromatographic system 10*a*, 10*b*, respectively, are shown. The chromatographic systems 10*a*, 10*b* may be substantially similar to the chromatographic system 10, except as otherwise provided herein. Accordingly, like reference numerals are used hereinafter and in the drawings to identify like components, while like reference numerals containing letter extensions (i.e., "a" and "b," respectively) are used to identify those components that have been modified. As illustrated in FIG. 1B, the chromatographic system 10*a* may include an oven 31*a* and a device 16*a*. The oven 31*a* may be adjacent to, and discretely formed relative to, the device 16*a*. The oven 31*a* and device 16*a* may be disposed within the gas chromatograph 12. As illustrated in FIG. 1C, the chromatographic system 10*b* may include an oven 31*b* and a device 16*b*. The oven 31*b* may be adjacent to, and discretely formed relative to, the device 16*b*. The device 16*b* may be disposed within the gas chromatograph 12, and the oven 31*b* may be disposed external to the gas chromatograph 12.

Figure 4:
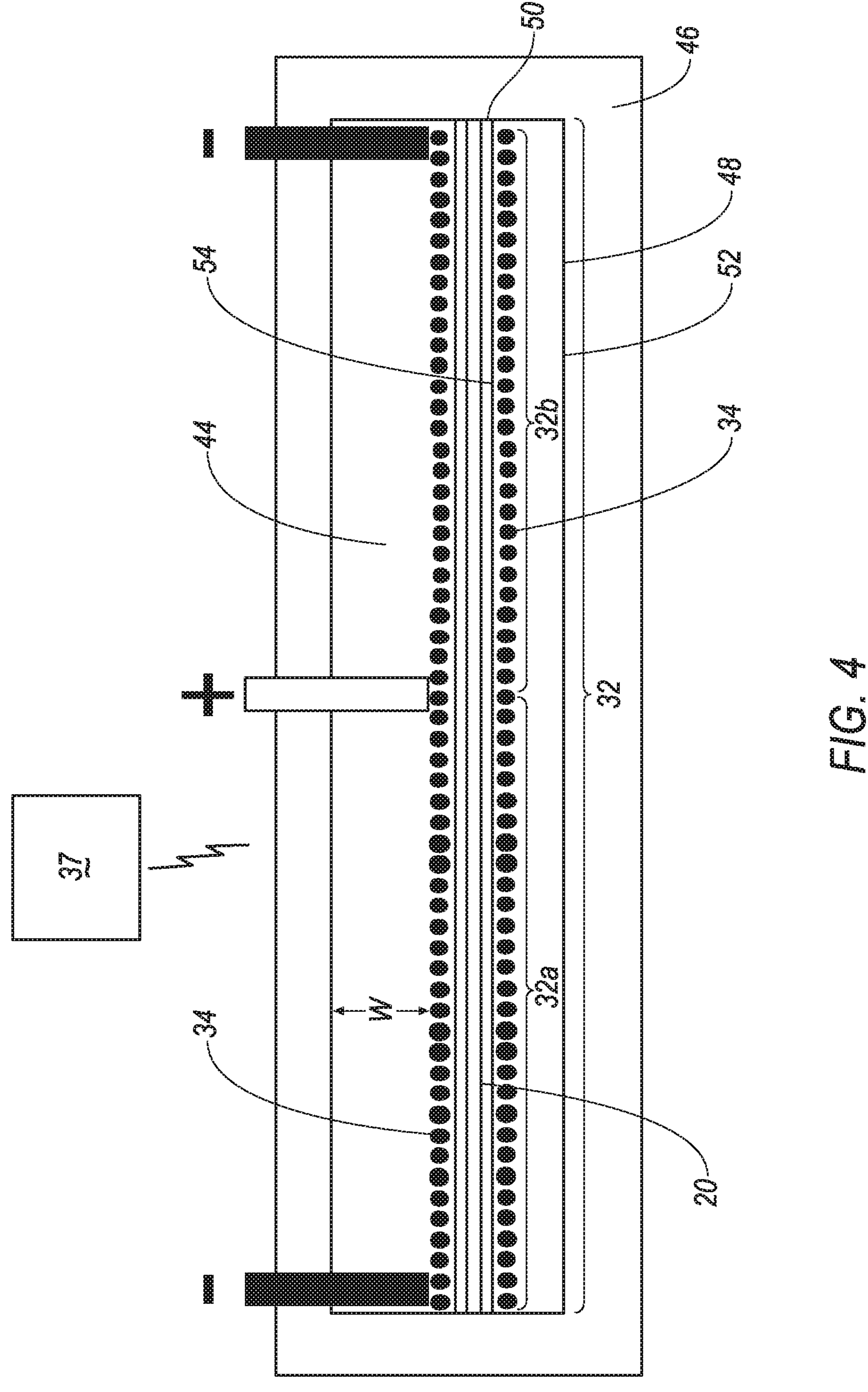
FIG. 4 is a perspective view of an example of a thermal buffer disposed in an example of a heat exchange block of an exemplary device for the system of FIG. 1.

In some implementations, device 16 is provided to control the temperature of a portion of capillary 18 in an efficient manner. For example, as illustrated in FIG. 4, device 16 is situated within a cold finger to control the temperature of at least one trapping zone 32 of capillary 18. The illustrated system 10 includes a two-stage modulation whereby device 16 may control the temperature of two trapping zones 32*a*, 32*b* of capillary 18. As previously described, it may be desired to alternate the trapping zone 32 between a first, cooled (or trapping) temperature and a second, heated (or desorption) temperature to control a flow characteristic of the analytes within trapping zone 32 of capillary 18.

Device 16 acts as a thermal modulation device to efficiently heat and cool trapping zone 32 of capillary and to manage the load experienced by a cooling device situated against device 16. The configurations described below introduce variants of different materials, structures and schemas fashioned with the dual purpose to selectively: (i) during a first time frame: (a) raise the heat about trapping zone 32 quickly, (b) retain the heat within the trapping zone 32, and (c) minimize the draw of heat from trapping zone 32; and (ii) during a second time frame: remove heat from the trapping zone 32 and direct same toward a cooling device.

In some implementations, and in various configurations and combinations, this heating and cooling of trapping zone 32 of capillary 18 can be effected by one or more of: (i) a cooling device 33 (FIG. 2A, FIG. 2B, FIG. 5A, FIG. 5B), such as a heat sink, for example, that is situated external to chamber 24, (ii) a heater 34 (FIG. 4, FIG. 3B) that is situated inside chamber 24, or more proximate to capillary 18 relative to cooling device 33, (iii) an auxiliary heater 35 (FIG. 3A, FIG. 3B, and FIG. 3C) that may be situated, in one form or another, between cooling device 33 and heater 34, (iv) a thermal buffer 44 (FIG. 2A-FIG. 5B) that may be situated, in one form or another, between cooling device 33 and heater 34, and (v) a combination of any number of the items (i)-(iv). Examples of the foregoing arrangements, and combinations thereof, will be described in more detail below.

FIG. 2A, FIG. 2B, FIG. 3A, and FIG. 3C each illustrate a cold finger 36 having a first portion 38 that is in thermal contact with trapping zone 32 (see FIG. 4) of capillary 18. As depicted, first portion 38 of cold finger 36 extends to a second portion 40 that is situated external to chamber 24.

In some implementations, first portion 38 of cold finger 36 defines a terminal end 42 that is in thermal contact with trapping zone 32 of capillary 18. In some implementations, cold finger 36 is a cylinder having a diameter that is at or about 0.5 cm and has a thermal exchange area of 0.2 $cm^2$ proximate the terminal end 42. In an implementation, cold finger 36 comprises a material that has a high thermal conductivity, such as, for example, copper and copper alloys.

In some implementations, cold finger may be a material that yields a low thermal conductivity at lower temperatures, such as those properties exhibited by brass and the like. This may be desired because at low temperatures the lower conductivity thereof lessens the conduction of heat to the cooler, thereby lessening the load.

In some implementations, a thermal buffer 44 is provided around a periphery of heater 34 about trapping zone 32. For example, in an implementation where heater 34 includes a wire, the thermal buffer 44 may reside between the environment and the outer radius of the coiled wire. In some implementations, the wire is at least partially encapsulated within thermal buffer 44. In some implementations, thermal buffer 44 may buffer the heat of the heater 34 as it passes through a width (W) of thermal buffer 44 so that the temperature of an environment outside of thermal buffer 44 is buffered by thermal buffer 44.

In some implementations, thermal buffer 44 comprises a material having a variable thermal conductivity such that the thermal conductivity thereof is higher at low temperatures and lower at high temperatures. For example, thermal buffer 44 may be an alumina material. In some implementations, and those shown in FIG. 2A and FIG. 2B, thermal buffer 44 may be provided in such a configuration and manner that (i) when heater 34 is ON, the thermal conductivity of thermal buffer 44 is low and the heat transferred into cold finger 36 from heater 34 is generally buffered thereby, and, (ii) when heater 34 is OFF, the thermal conductivity of thermal buffer 44 changes, perhaps gradually, to a higher thermal conductivity such that the buffering effect thereof is less than the buffering effect when heater 34 is ON.

Figure 3A:
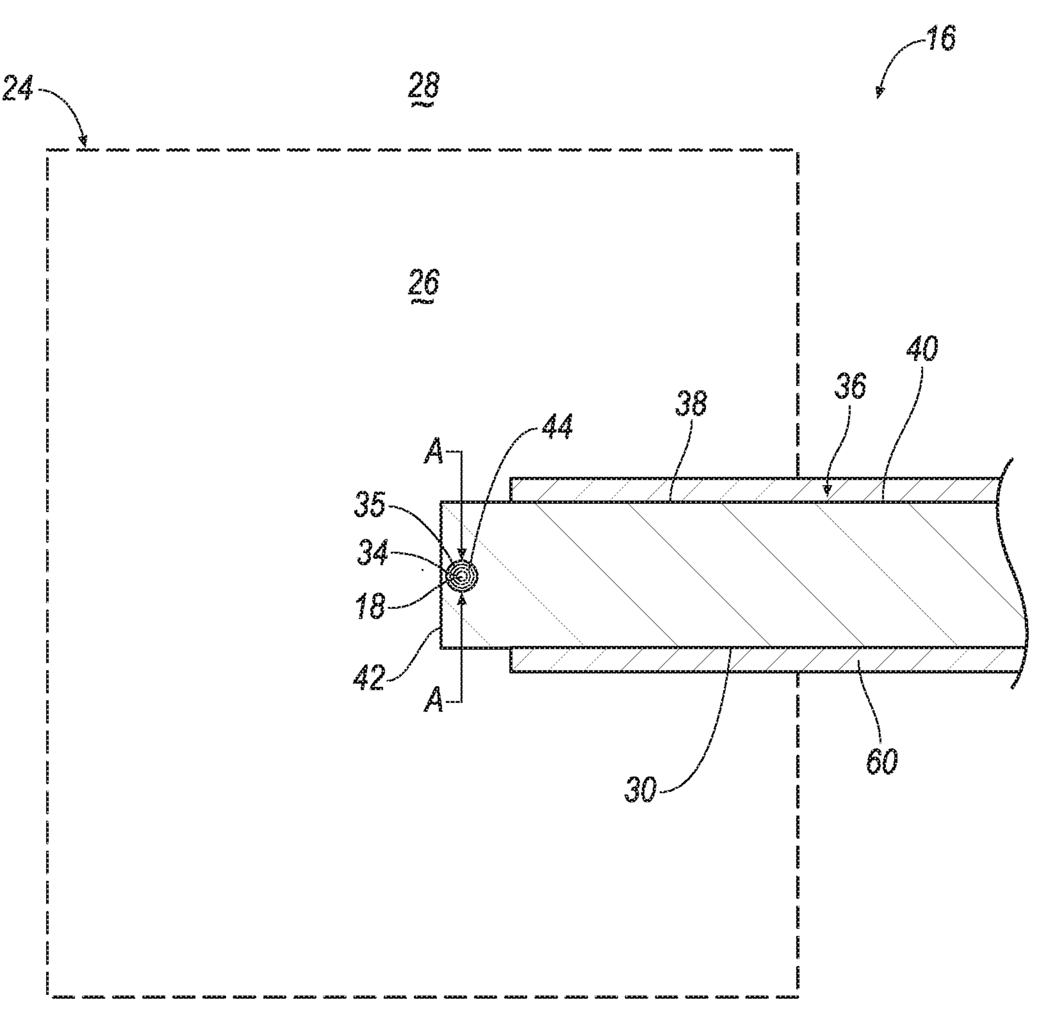
FIG. 3A is a cross-sectional view of an example of a device for the system of FIG. 1.
Figure 3B:
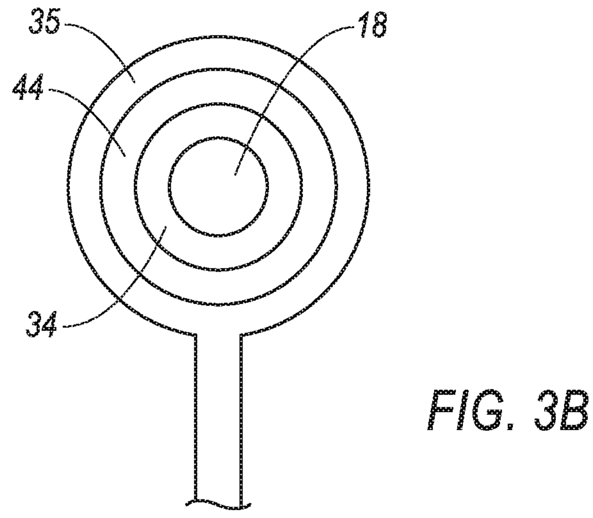
FIG. 3B is an exploded view of the device of FIG. 3A taken along the line A-A.
Figure 3C:
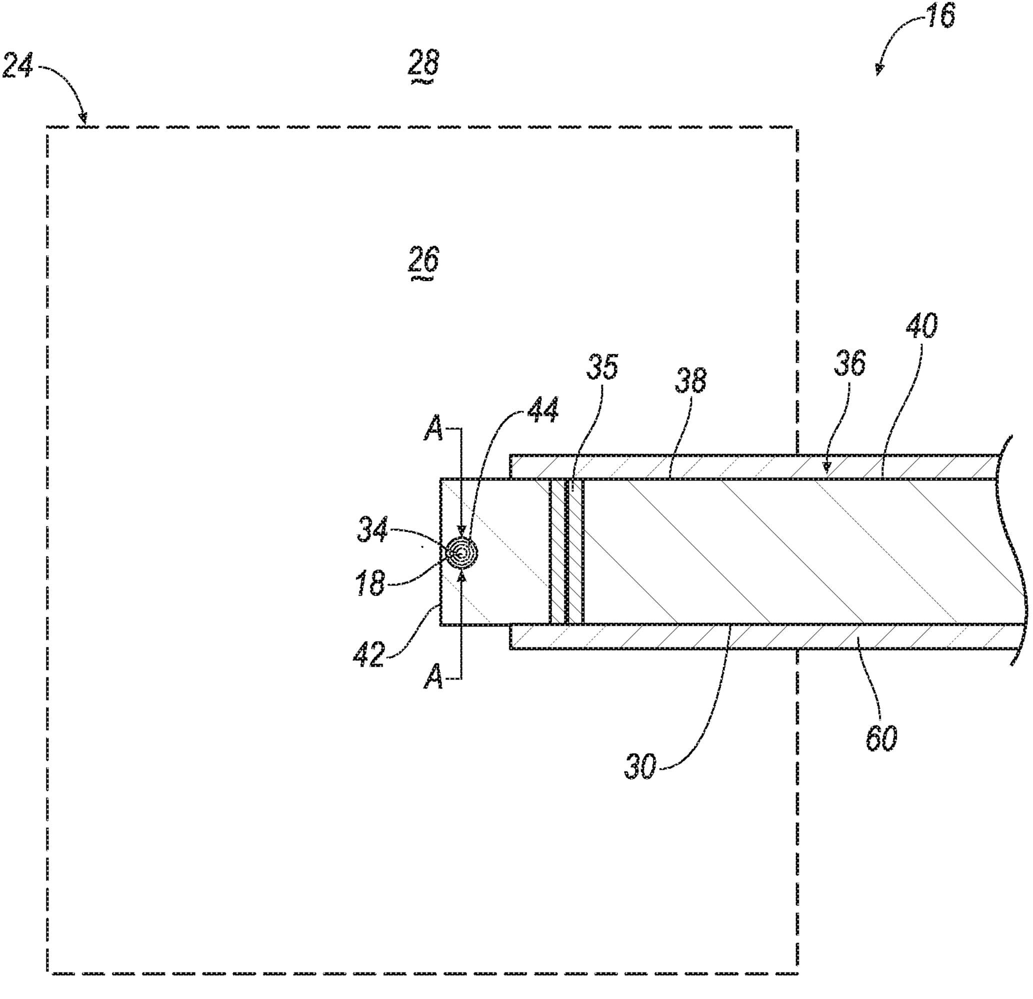
FIG. 3C is a cross-sectional view of an example of a device for the system of FIG. 1.

In some implementations, and those shown in FIG. 3A, FIG. 3B, and FIG. 3C, thermal buffer may alternatively be provided as an insulative material such as a Kapton® film or a similar polyimide surrounding at least a portion of heater 34. In implementations, it is desired to provide a thickness thereof that is adapted to (i) contain the heat sufficiently within capillary 18 when heater 34 is ON (e.g., thick enough to insulate during the heating period) and (ii) thin enough that it allows sufficient capillary cooling when heater 34 is OFF.

As shown in FIG. 2A, FIG. 2B, FIG. 3A, FIG. 3C, and FIG. 4, heater 34 may be in thermal contact with trapping zone 32 of capillary 18 and configured to transfer heat to trapping zone 32. In some implementations, heater 34 may include a wire that is wrapped about a length of the trapping zone 32 of capillary 18. In other implementations, other forms of heating may be used such as, for example, other resistive heating or hot gas jets. In some implementations, a controller 37 is provided to selectively alternate trapping zone 32 between (i) a cooling temperature by turning off the heat and using cooling device 33, and (ii) an injection temperature using heater 34. the controller 37 may control the heater 34 to alternate between an ON state and an OFF state at a user defined interval Referring now to FIG. 3A, FIG. 3B, and FIG. 3C, in combination with FIG. 4, in some implementations, and as mentioned above, an auxiliary heater 35 may be provided at a location that is set-off from heater 34 such that thermal buffer 44 is disposed between heater 34 and auxiliary heater 35. FIG. 3A and FIG. 3B depict auxiliary heater 35 proximate thermal buffer 44. Alternatively, heater 35 may be provided at a location further off-set from heater 34 such that it resides at a location along the body of cold finger 38. While auxiliary heater 35 is depicted inside of oven 26 in FIG. 3C, it is to be appreciated that it may be located at any portion along cold finger between thermal buffer 44 and cooler 33. In an implementation, auxiliary heater 35 includes a heating element that is at least partially surrounded by a substrate. In an example, substrate of auxiliary heater comprises a material having a thermal conductivity that decreases when its temperature increases. For example, and among others, such material may include a single crystal material, such as, MgO, sapphire, and the like.

In such an arrangement, auxiliary heater 35 acts as a thermal valve; in other words, when the temperature of the substrate of auxiliary heater 35 is elevated (by selectively activating heating element of auxiliary heater), its thermal conductivity decreases and so it, resultantly, dampens any thermal transfer between the trapping zone 32 of capillary 18 and cooling device 33 as it acts as a barrier between trapping zone 32 and cooling device to thereby selectively minimize the thermal load experienced by cooling device 33. Conversely, when the temperature of the substrate of the auxiliary heater is decreased (by selectively deactivating heating element of auxiliary heater), its thermal conductivity increases and so it, resultantly, increases the thermal transfer between the trapping zone 32 of capillary 18 and cooling device 33. In an implementation, auxiliary heater 35 is utilized to selectively, and substantially, match the temperature of the trapping zone 32 to dampen thermal transfer between trapping zone 32 and cooling device 33. In an implementation, auxiliary heater 35 is utilized to selectively control the temperature of the trapping zone 32 and to dampen thermal transfer between trapping zone 32 and cooling device 33.

In some implementations, device 16 is configured in such a manner, and as described in specificity herein, whereby capillary 18 is heated to a desorption temperature at a predetermined rate or during a first predetermined amount of time (T1) and cooled at a predetermined rate or during a second predetermined amount of time (T2). For example, in some implementations, the first predetermined amount of time (T1) is substantially at or between 0.5 ms and 20 ms and in another implementation the time (T1) is substantially at or between 3 ms and 10 ms. In some implementations, the second predetermined amount of time (T2) is at or between 20 ms and 200 ms.

In some implementations, heating to a desorption temperature at a predetermined rate or during a first predetermined amount of time (T1) may include applying a high current pulse (e.g., 3-12 ampere capacitive discharge) to the heater 34. In some implementations, heater 34 is maintained at a predetermined temperature for a third predetermined amount of time (T3). In some implementations, a third period of time (T3) may optionally be introduced to clear the trap between the first and second predetermined amounts of time. In an implementation, the third period of time (T3) may be substantially at or between 10 ms and 30 ms. An application of a low current pulse (e.g., 1-5 ampere auxiliary discharge) may be provided to the heater 34, to facilitate the trap clearing process.

In some implementations, cooling device 33 provides cryogenic temperatures. In some implementations, cooling device 33 includes a Stirling cooler. Other cooling devices are contemplated including a Peltier module and a liquid nitrogen applicator.

The configurations herein described yield a system that can reduce the cooling power requirement of cooling device 33 needed to maintain a temperature about cold finger 36, at least during the period of time (T1) while heater 34 is ON. And so, the load, or power requirement, from cooling device 33 is reduced because the heat from heater 34 is buffered from transferring to cold finger 36 during such period of time (T1).

Referring back to FIG. 2A, FIG. 2B, FIG. 5A, and FIG. 5B a heat exchange block 46 may optionally be utilized to encapsulate thermal buffer 44, whereas the embodiments of FIG. 3A, FIG. 3B, and FIG. 3C operate without such a heat exchange block as further described herein.

Figure 2B:
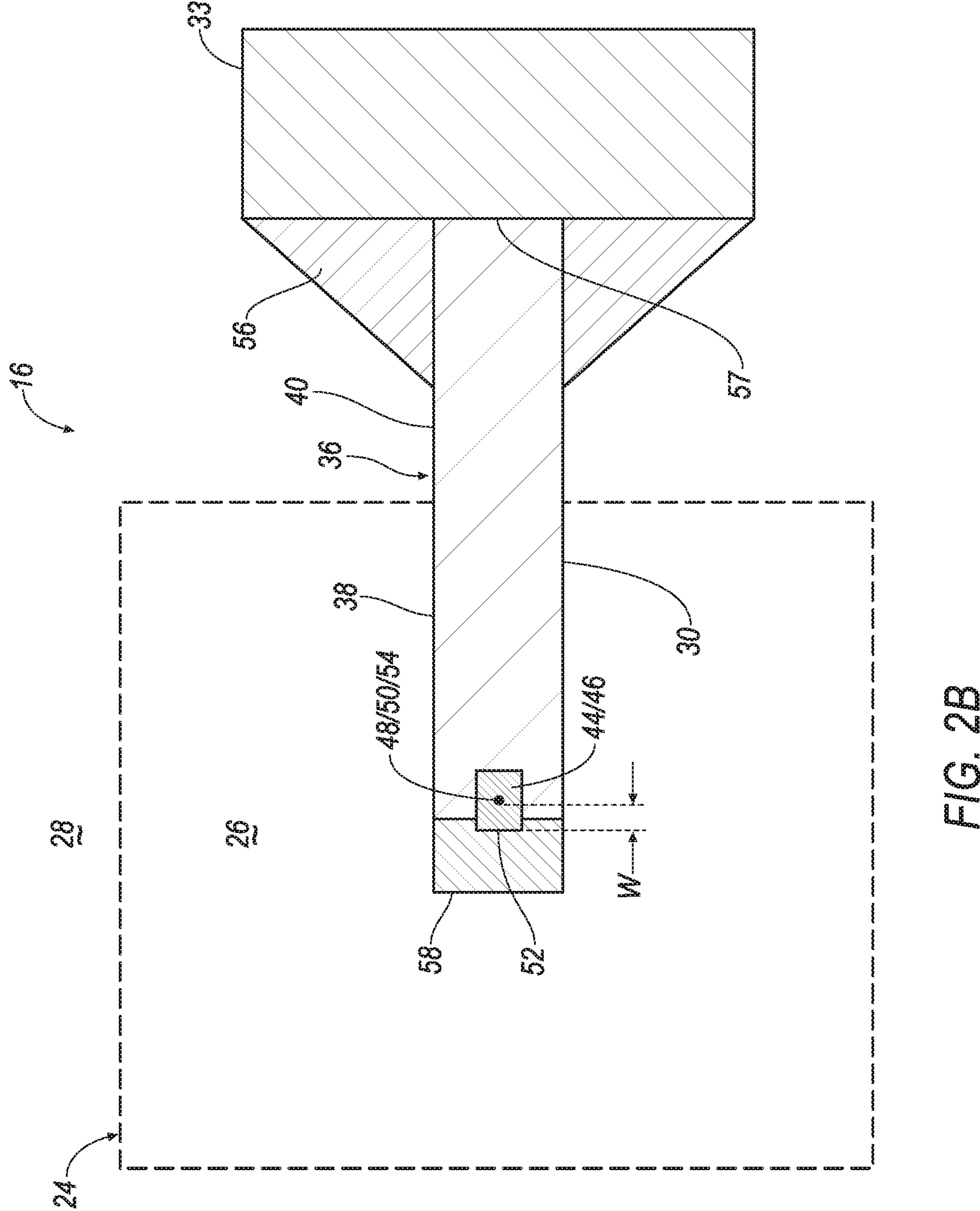
FIG. 2B is a cross-sectional view of an example of a device for the system of FIG. 1.

While thermal buffer 44 and heat exchange block 46 in these configurations are described, and shown, as two discrete bodies in FIG. 2A, they may be combined as a single body and comprised of a single material as they exhibit similar characteristics as shown in FIG. 2B. With that understanding, the depicted two discrete bodies of FIG. 2A will be described hereinafter.

In the configuration of FIG. 3A, FIG. 3B, and FIG. 3C, where a brass cold finger 36 is utilized, the cold finger serves the dual purpose as that which is exhibited by the heat exchange block previously described such that the brass has a lower thermal conductivity at lower temperatures. This is desired because at low temperatures the cooler has less cooling power and the lower conductivity of the brass at the lower temperatures lessens the conduction of heat to the cooler, lessening the load experienced thereby.

In some implementations, heat exchange block 46 may be provided in thermal engagement with first portion 38 of cold finger 36. In some implementations, heat exchange block 46 comprises a material having a low thermal conductivity. In some implementations, the thermal conductivity coefficient of heat exchange block 46 is at or under 0.25 when the temperature of heat exchange block is at or between 50k and 100k. In some implementations, the material of the heat exchange block 46 may include alumina, quartz glass, borosilicate glass, silica, silicon carbide, high temperature silicone elastomer, PTFE, or brass. Other materials demonstrating the earlier described properties may be suitable as well.

In some implementations, heat exchange block 46 defines a channel 48. Capillary 18 may extend through channel 48 of heat exchange block 46. In some implementations, thermal buffer 44 lines channel 48 and defines an elongate tubular body having (i) an outer surface that is in direct thermal contact with an inner surface of channel 48 of the heat exchange block 46 and (ii) a second (e.g., inner) surface in direct thermal contact with one or both of heater 34 and trapping zone 32 of capillary 18. In some implementations tubular body of thermal buffer 44 is cylindrical, but other tubular configurations may be utilized as well. In some implementations, heat exchange block 46 is parallelpiped shaped having at least three sides in direct thermal contact with cold finger 36.

In some implementations, the thermal buffer 44 defines a channel 50 with the aforementioned thickness, or width, between its outer surface 52 and its inner surface 54. In an implementation, this thickness may be at or about the thermal diffusion length calculated for the total duration of the discharge, namely:

$$L = \sqrt{(2at)} \tag{1}$$

where L is the diffusion length, a is diffusivity, t is total duration of the discharge (e.g., heating). The thickness of the thermal buffer 44 may be such that heat does not pass completely through the thermal buffer 44 during the total duration of the discharge.

Referring again to FIG. 2A, the device 16 may include a heat flow concentrator 56 that is disposed around the second portion 40 of cold finger 36 and configured to provide a secondary conduction zone with cooling device 33. For example, heat flow concentrator 56 may provide a secondary conduction zone with a cold tip 57 of cooling device 33. In some implementations, heat flow concentrator 56 is generally frustoconical and defines a base and a point, wherein the base abuts against the cooling device 33.

The device 16 may further include an insulator 58 disposed within chamber 24 and about an end of first portion 38 of cold finger 36. In an implementation insulator 58 is configured to transfer heat to first portion 38 of cold finger 36. In an implementation, insulator 58 is in direct thermal engagement with heat exchange block 46 and cold finger 36. In this regard, in some implementations insulator 58 may be integrally and/or monolithically formed with heat exchange block 46. For example, insulator 58 and heat exchange block 46 may be constructed from the same type of material and/or the same piece of material.

Figure 5A:
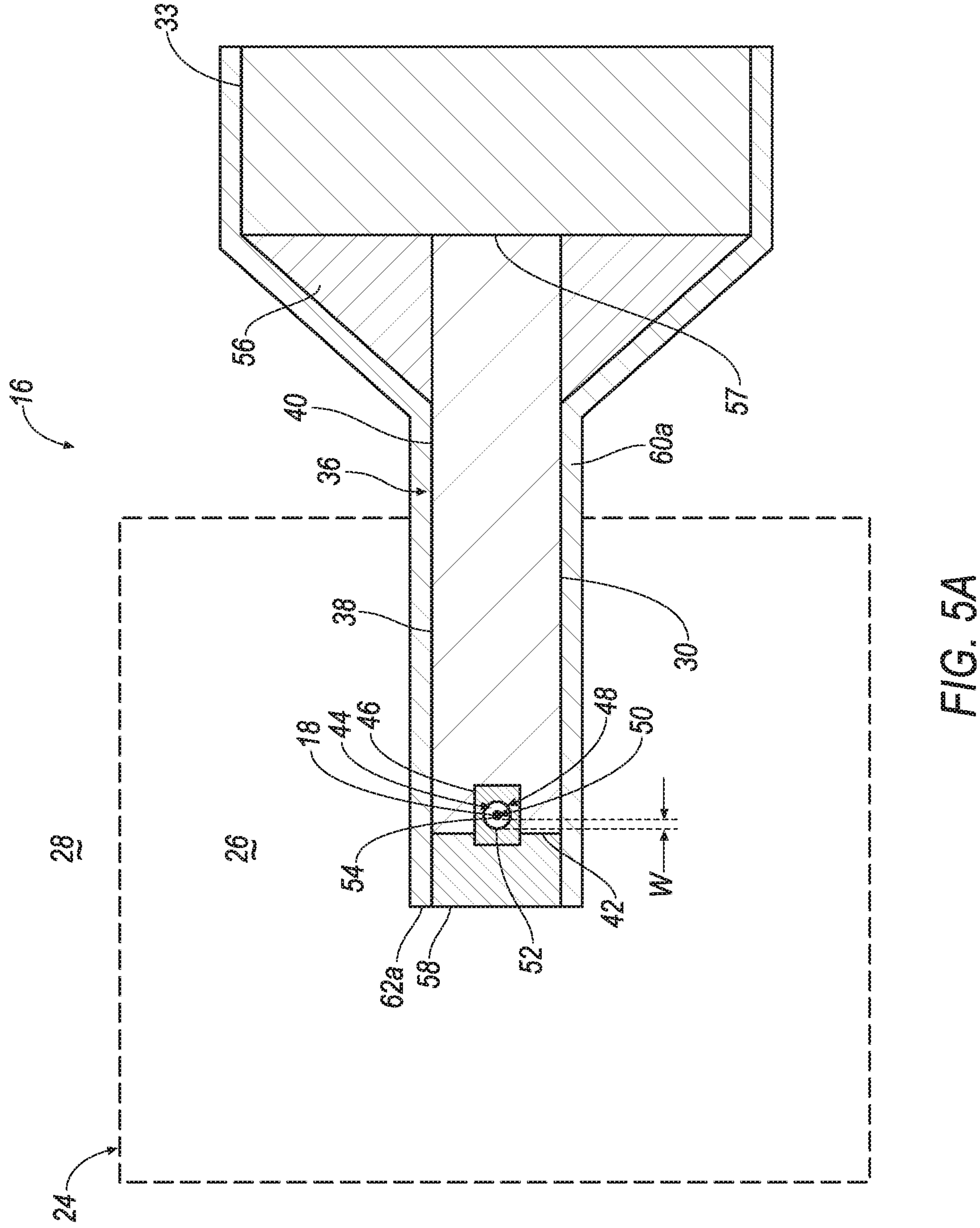
FIG. 5A is a cross-sectional view of another exemplary device for the system of FIG. 1.
Figure 5B:
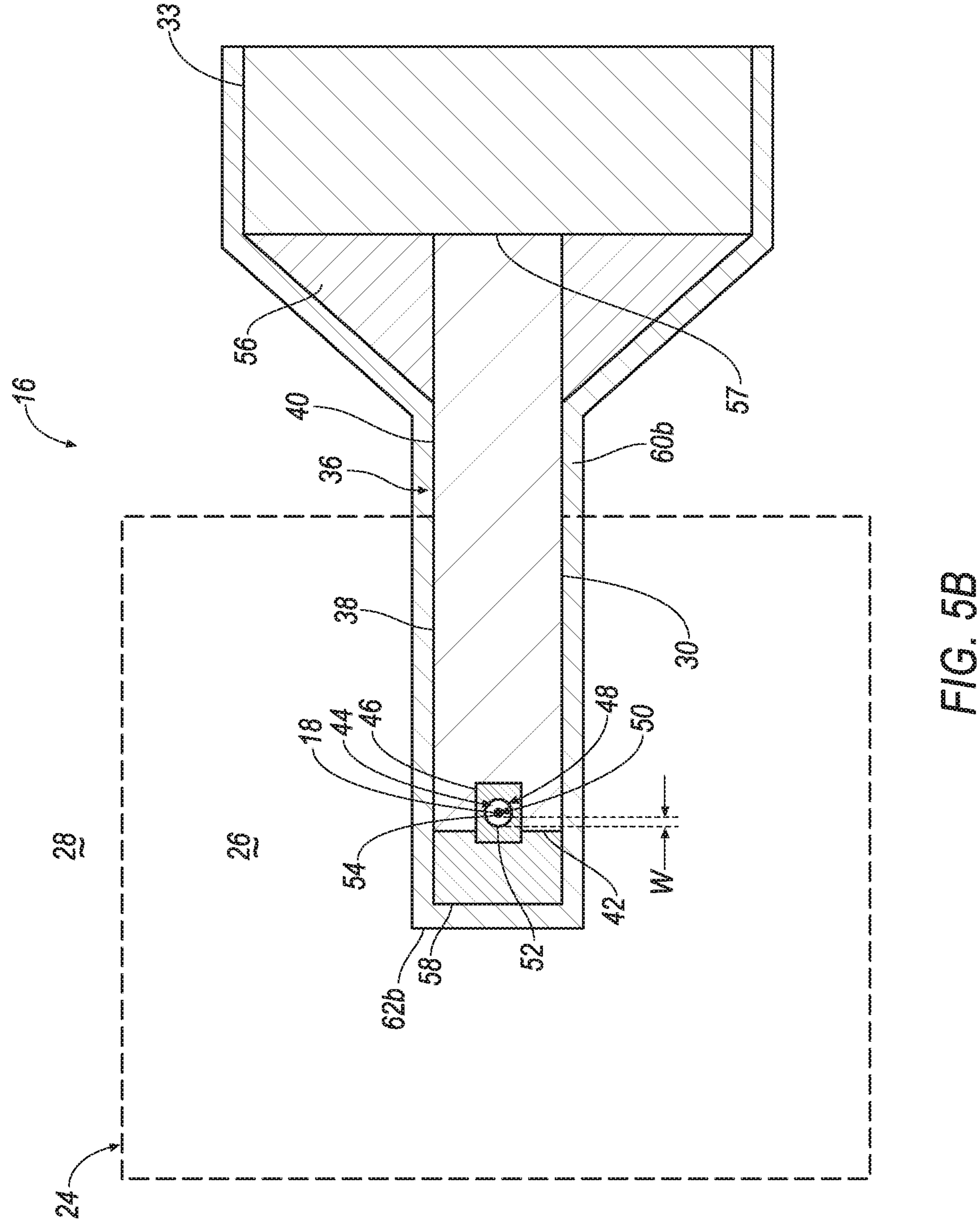
FIG. 5B is a schematic view of another exemplary device for the system of FIG. 1.

As illustrated in FIG. 2A, in some implementations, an insulator 60 is provided around a periphery (e.g., circumference) of the cold finger 36. For example, the insulator 60 may surround the cooling device 33 and extend along the first and second portions 38, 40 of the cold finger 36. A terminal end 62 of the insulator 60 may be aligned with the terminal end 42 of the cold finger 42. The insulator 60 may include a variety of materials within the scope of the present disclosure, including rock wool, for example. With reference to FIGS. 5A and 5B, other implementations of a device 16*a*, 16*b* having an insulator 60*a*, 60*b*, respectively, are shown. Like reference numerals are used hereinafter and in the drawings to identify like components, while like reference numerals containing letter extensions (i.e., "a" and "b," respectively) are used to identify those components that have been modified. As illustrated in FIG. 5A, in some implementations, the terminal end 62*a* of the insulator 60*a* may extend to, or otherwise be aligned with, a terminal end of the insulator 58. As illustrated in FIG. 5B, in other implementations, the terminal end 62*b* of the insulator 60*b* may extend beyond, or otherwise surround, a terminal end of the insulator 58.

A method for modulating analytes in a gaseous stream passing through a device (e.g., device 16) will now be described, where the analytes are retained in the device, or allowed to pass through the device, based on certain device conditions.

In an implementation such a method comprises: providing a capillary (e.g., capillary 18) that extends through a heating member (e.g., heater 34), the capillary and heating member being surrounded by a thermal buffer (e.g., thermal buffer 44), the thermal buffer comprising a material selected from the group consisting of either (i) a variable thermal conductivity such that the thermal conductivity thereof is higher at low temperatures and lower at high temperatures, or (ii) a thin film insulator, such as a polyimide (e.g., Kapton®); heating the heater to a first temperature to desorb the analytes within the capillary to allow the analytes to pass through the capillary during a first time period; and turning off the heater and cooling the capillary to a second temperature that is sufficient to trap and focus the analytes in the capillary during a second time period, wherein, during the first time period, the thermal buffer holds back heat from the cooling device to heat the capillary quickly and to minimize a heat load to a cooling device (e.g., cooling device 33), and further wherein, during the second time period, slowly (relative to the heating) lets heat flow into the cold finger and away from the capillary.

In another implementation such a method comprises: providing a capillary (e.g., capillary 18) that extends through a heating member (e.g., heater 34), the capillary and heating member being surrounded by a thermal buffer (e.g., thermal buffer 44), the thermal buffer comprising a material having a variable thermal conductivity such that the thermal conductivity thereof is higher at low temperatures and lower at high temperatures; providing a heat exchange block (e.g., heat exchange block 46) circumscribing at least three sides of the thermal buffer, wherein the heat exchange block comprises a material having a low thermal conductivity; providing a cold finger (e.g., cold finger 36) thermally engaging the heat exchange block and terminating at a cold tip (e.g., cold tip 57) at a position that is external to the device, wherein the cold finger comprises a material having a high thermal conductivity and a mass configured to function as an inertial thermal reservoir; during a time period (e.g., T1), heating the heater to a first temperature to desorb the analytes within the capillary to allow the analytes to pass through the capillary, wherein the increase in temperature lowers the thermal conductivity of the thermal buffer such that heat from the thermal buffer is maintained thereat; during a time period (e.g., T3), maintaining the temperature of the heater at the first temperature, during a time period (e.g., T2), turning off the heater and cooling the capillary to a second temperature that is sufficient to trap and focus the analytes in the capillary, whereby the cooling temperature experienced by the capillary is dampened at higher temperatures due to the thermal conductivity of the thermal buffer, and wherein the thermal conductivity of the thermal buffer increases as the temperature decreases; whereby, due to the thermal conductivity properties of the thermal buffer and the heat exchange block, the system holds back heat from the cold finger during the first time period to heat the capillary quickly and to minimize a heat load to a cooling device (e.g., cooling device 33) and slowly (relative to the heating) lets heat flow into the cold finger and away from the capillary, during the second time period.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A thermal modulator for extension between a cooling device and a capillary, the thermal modulator comprising:
- a cold finger;
- a thermal buffer disposed between the cold finger and the capillary, the thermal buffer comprising a material having a variable thermal conductivity including a higher thermal conductivity at low temperatures and a lower thermal conductivity at high temperatures; and
- a heater situated between the capillary and the thermal buffer.

2. The thermal modulator of claim 1, wherein the cold finger extends between the capillary and the cooling device.

3. The thermal modulator of claim 1, wherein the cold finger defines a chamber having an inner wall.

4. The thermal modulator of claim 3, wherein the thermal buffer disposed between the cold finger and the capillary is disposed about the inner wall of the cold finger.

5. The thermal modulator of claim 1, wherein the thermal buffer has a thermal conductivity that decreases as a temperature thereof increases such that the thermal buffer retains heat on the capillary when heated by the heater.

6. The thermal modulator of claim 1, wherein the thermal buffer has a thermal conductivity that decreases as a temperature thereof increases such that the thermal buffer dissipates heat toward the cold finger.

7. The thermal modulator of claim 1, wherein the cold finger comprises brass.

8. The thermal modulator of claim 1, wherein:
- the capillary has an input, an output, and an elongate body extending between the input and the output;
- the cold finger has a first portion and a second portion, the first portion in thermal contact with a portion of the elongate body to define a capillary trapping zone; and
- the heater is in thermal contact with the capillary trapping zone and configured to transfer heat to the capillary trapping zone.

9. The thermal modulator of claim 8, further comprising a controller configured to selectively alternate the capillary trapping zone between a cooling temperature and an injection temperature by alternating the heater between an off state and an on state at a user defined frequency.

10. The thermal modulator of claim 8, further comprising a heat exchange block in thermal engagement with the first portion of the cold finger and comprising a material having a low thermal conductivity coefficient.

11. The thermal modulator of claim 8, further comprising a flow concentrator disposed around a length of the second portion of the cold finger and configured to provide a conduction zone within the cooling device.

12. A thermal modulator for extension between a cooling device and a capillary, the thermal modulator comprising:
- a cold finger;
- a thermal buffer disposed between the cold finger and the capillary, wherein the thermal buffer comprises a polyimide; and
- a heater situated between the capillary and the thermal buffer.

13. A thermal modulator for extension between a cooling device and a capillary, the thermal modulator comprising:
- a cold finger;
- a thermal buffer disposed between the cold finger and the capillary;
- a heater situated between the capillary and the thermal buffer; and
- an auxiliary heater disposed between the cooling device and the thermal buffer.

14. The thermal modulator of claim 13, wherein the auxiliary heater directly abuts against the thermal buffer.

* * * * *